(12) United States Patent
Huang

(10) Patent No.: US 8,869,355 B2
(45) Date of Patent: Oct. 28, 2014

(54) CABLE MANAGEMENT APPARATUS AND METHOD

(76) Inventor: Jay J. Huang, Eatontown, NJ (US)

( * ) Notice: Subject to any disclaimer, the term of this patent is extended or adjusted under 35 U.S.C. 154(b) by 100 days.

(21) Appl. No.: 13/363,512

(22) Filed: Feb. 1, 2012

(65) Prior Publication Data

US 2013/0192032 A1    Aug. 1, 2013

(51) Int. Cl.
   *B65H 75/02*    (2006.01)
   *B65H 75/28*    (2006.01)
   *B65H 75/40*    (2006.01)

(52) U.S. Cl.
   USPC ............. 24/332; 24/329; 24/331; 248/229.13

(58) Field of Classification Search
   USPC ............................................ 248/451, 229.13
   See application file for complete search history.

(56) References Cited

U.S. PATENT DOCUMENTS

| | | | |
|---|---|---|---|
| 2,171,665 A * | 9/1939 | Meltzer | 248/316.7 |
| 3,096,551 A * | 7/1963 | Shoberg | 24/132 R |
| RE27,986 E | 4/1974 | Jensen | |
| 5,520,201 A | 5/1996 | Hart | |
| 5,549,127 A | 8/1996 | Chang | |
| 6,257,250 B1 | 7/2001 | Sartena | |
| 7,559,125 B2 * | 7/2009 | Cofer | 24/487 |
| 7,753,058 B2 | 7/2010 | Chudzik | |
| 7,992,579 B2 | 8/2011 | Longoria | |

FOREIGN PATENT DOCUMENTS

| | | |
|---|---|---|
| CN | 201928420 U | 8/2011 |
| DE | 4126724 A1 | 2/1993 |
| RU | 45062 U1 | 4/2005 |
| RU | 2433565 C1 | 11/2011 |

* cited by examiner

*Primary Examiner* — Jack W Lavinder

(57) ABSTRACT

Clip-type cable management devices are disclosed. In one embodiment, a first primary jaw (110) and a second primary jaw (112) having interleaved tines are coupled by a hinge pin (114) around which a primary torsion spring (116) is disposed to urge the primary jaws pivotally close. A secondary jaw (118) is disposed on the hinge pin and urged by a secondary torsion spring (120) pivotally toward the second primary jaw. A lever pin (122) is disposable in either a storage position or a working position on the first primary jaw so as to differentiate the pivotal opening of the secondary jaw, which is operable through the primary jaws. Resulting device is compact, quick and easy to operate, and packed with an array of functionalities applicable to cables of various sizes.

18 Claims, 10 Drawing Sheets

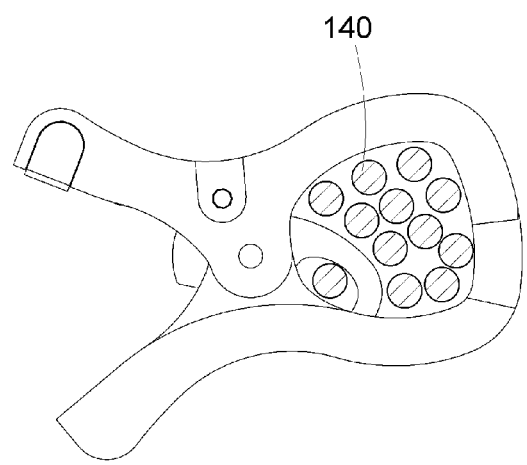
Fig. 5
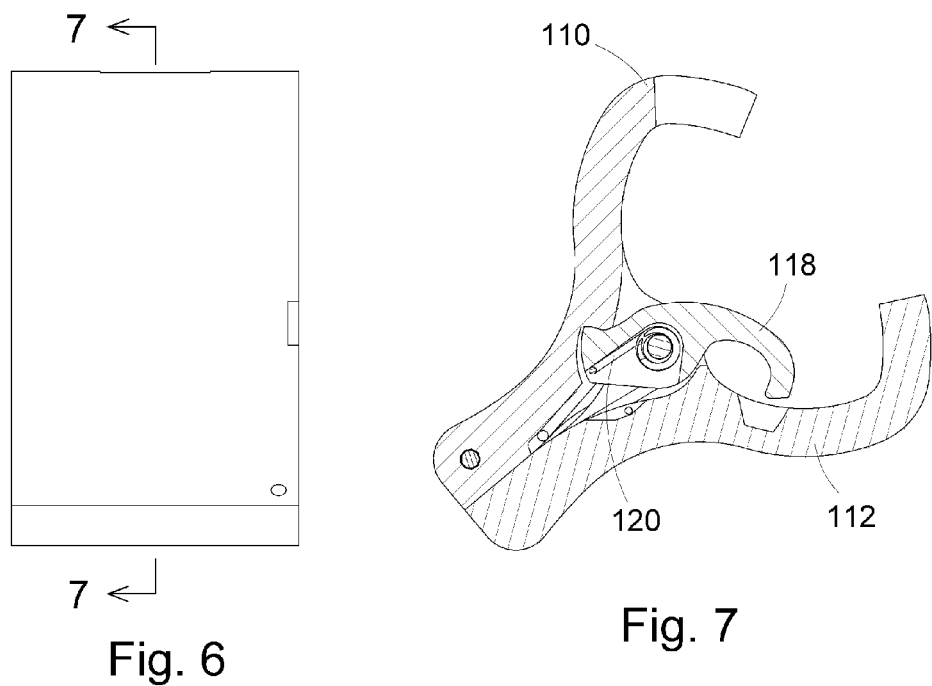
Fig. 6
Fig. 7

CABLE MANAGEMENT APPARATUS AND METHOD

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

This invention relates to the organization and management of cables and objects of similar shapes and properties. Cables are ubiquitous in our lives, and those associated with electronic devices have exhibited unprecedented popularity nowadays due to continued and rapid growth of such devices. While people enjoy using headsets, earphones, chargers, audio/video cords, power cords, computers cables and more, we are all faced with the task and challenge of how to keep them properly managed for reasons of productivity, ergonomics, protection, safety, and so forth.

Prior to this invention, there have been various tools and devices adopted to address this common issue. Twist ties, zip ties, hook-and-loop straps, cable retractors, cable wrappers, rubber bands are among the most seen examples in this regard. Although these tools can suffice for the purpose of getting cables organized, they appear to have limitations and drawbacks, and sometimes the problems are so undesirable to users that they would rather leave cables unmanaged than use such tools. For example, headsets for mobile phones and music players are among the most commonly used accessories, and far too often an average user would find it unpleasant and cumbersome to apply cable organizers based on tying a strap around the cables or wrapping cables around an object, especially such operations become frequent and repetitive. A cable retractor, as a different example, offers much improved user interactions by coiling and uncoiling cables through a spring-loaded core. The obvious drawback, however, is that cable retractors add significant weight and volume to the cables due to inherent mechanical components. In addition, they typically require a cable to be continuously smooth, making it seldom suitable for popular items such as headsets in that their cables almost always have enlarged portions such as microphones and cable-split reinforcements. Thus, optimal cable management is still an unaddressed or under-addressed everyday issue in our lives, and there remains a strong need for a new type of device that can not only serve the basic functional purpose but offer the best user-experience such as exceptional ease of use, broad applicability, and other desirable features.

BRIEF DESCRIPTION OF THE DRAWINGS

Selected embodiments of the invention are disclosed in the detailed description in accordance with the drawings, in which:

FIG. 5 is a front side view of the first embodiment holding a bundle of cables of larger diameter.

FIG. 6 is a side view of the first embodiment.

FIG. 7 is a section view of the first embodiment corresponding to line 7-7 of FIG. 6 showing primary jaws in fully open position and lever pin in storage position.

DETAILED DESCRIPTION

Figure 1:
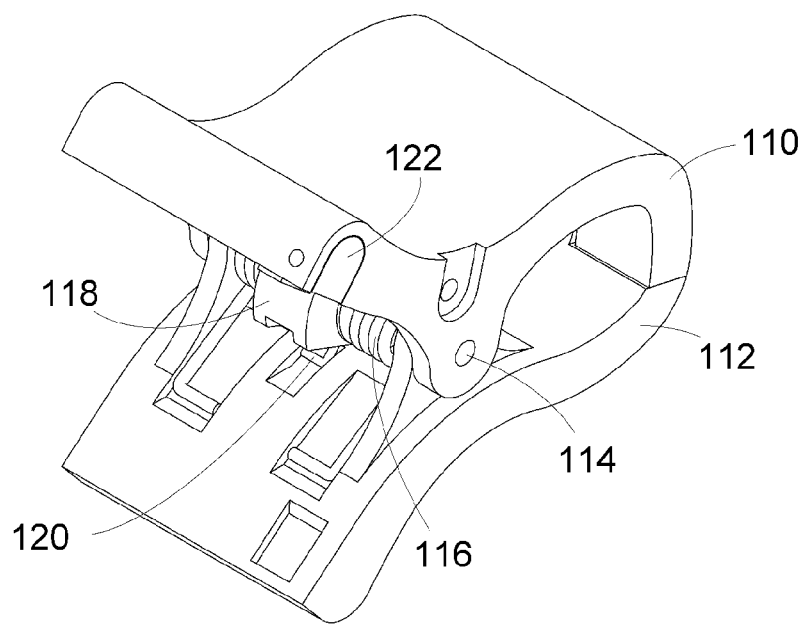
FIG. 1 is a perspective view of a first embodiment in accordance with the invention shown in closed position.
Figure 2:
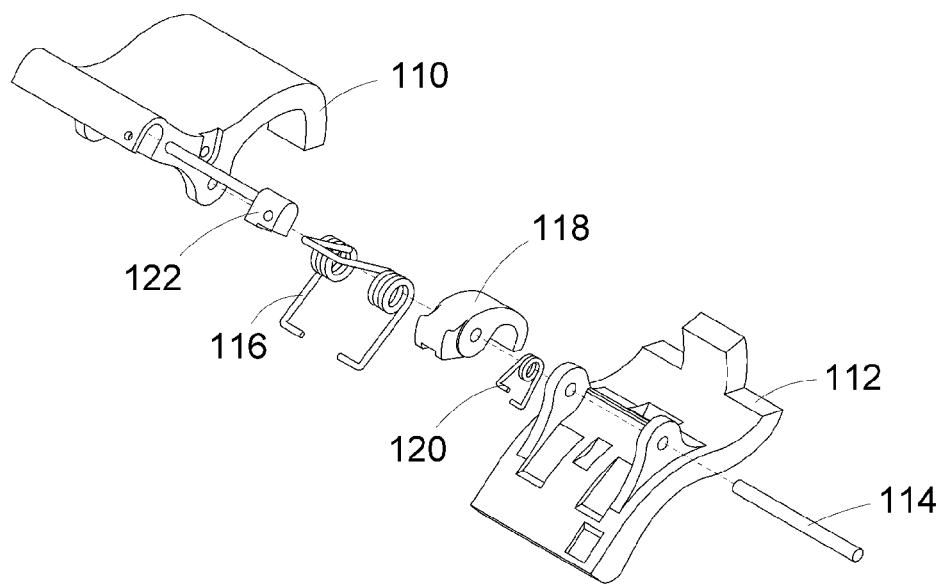
FIG. 2 is an exploded view of the first embodiment from FIG. 1.
Figure 3:
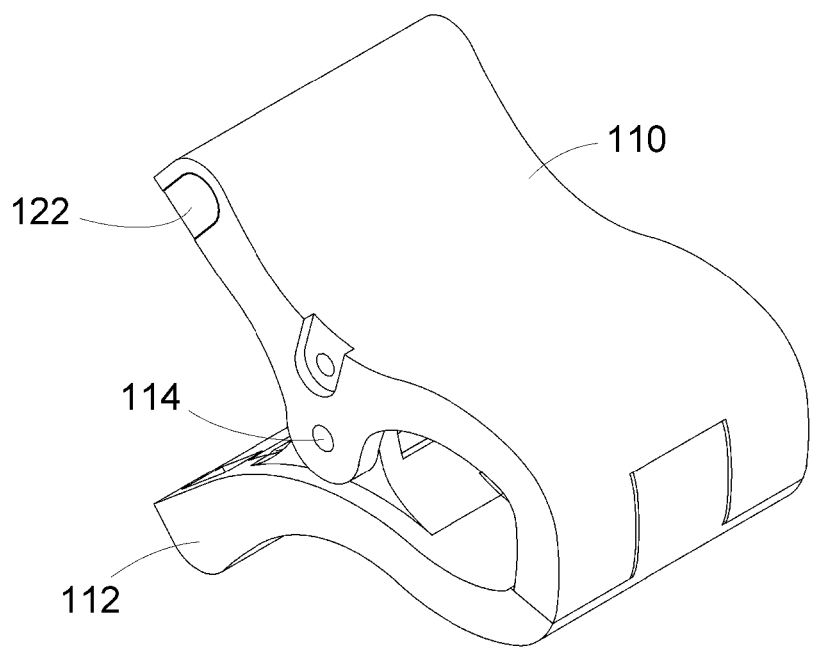
FIG. 3 is a perspective view of the first embodiment from another angle.

Referring to the drawings and particularly FIGS. 1-3 initially, a first embodiment is shown as a clip-type device comprising a first primary jaw 110 hingedly connected with a second primary jaw 112 by a hinge pin 114, a primary torsion spring 116 wound around hinge pin 114 urging the pair of primary jaws pivotally toward a closed position, a secondary jaw 118 hinged around the same hinge pin 114, a secondary torsion spring 120 urging the secondary jaw pivotally toward second primary jaw 112, and a lever pin 122 that can be disposed in either a storage position near the end of the handle of first primary jaw 110 or a working position near its center portion. Second primary jaw 112 features a tine at the end of its clipping portion and this tine is received in the space between two tines featured on first primary jaw 110 while in the closed position. Primary torsion spring 116 is a double torsion spring with a space between its two coil sections permitting the placement and interference-free pivotal movement of secondary jaw 118.

Figure 4:
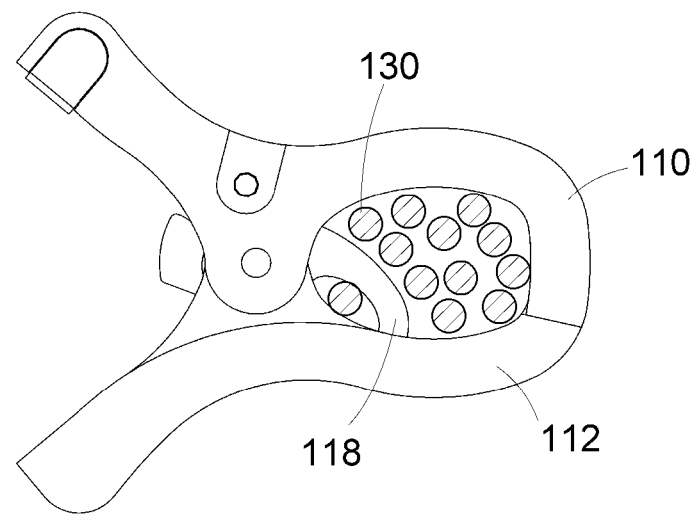
FIG. 4 is a front side view of the first embodiment holding a bundle of cables.

FIGS. 4-5 illustrate how the embodiment can manage cables of various sizes. Referring first to FIG. 4, a cable 130 is folded into a bundle of multiple cable segments with a single cable segment being retained securely between secondary jaw 118 and second primary jaw 112 as means to keep this device attached to the cable at all times if desired. The remaining cable segments are received in the enclosed space formed by two primary jaws. The primary jaws in FIG. 4 appears in a fully closed position due to relatively small diameter of cable 130 combined with number of folds selected for this illustration. This generally represents the lower limit of this embodiment's holding capacity.

When managing cables of larger volumes, this embodiment has a practical range of adaptability as illustrated in FIG. 5. In this example, a cable 140 has a larger diameter than that of cable 130 in FIG. 4 resulting in an increased overall volume. The embodiment accommodates such volume increase with its two primary jaws being partially open, yet still securing all cables as shown. This is accomplished as the opposing tines from the primary jaws remain interleaved and leave no space enough for a single cable segment to escape.

FIGS. 6-7 illustrate another advantageous feature of the embodiment. As can be better seen in the section view in FIG. 7, a notched area on the inner surface of first primary jaw 110 makes contact with the end portion of secondary jaw 118 and forces the latter to pivotally open counterclockwise while the primary jaws pivotally open up. This increases the holding space between secondary jaw 118 and second primary jaw 112. When there is a cable being retained in such holding space, this mechanism will effectively loosen the grip on the cable so that the embodiment can slidably move along the cable for desired placement adjustments. The amount of the pivotal movement of secondary jaw 118 is further precisely regulated by the primary jaws as shown so that there is no big enough gap between the tip of secondary jaw 118 and inner surface of second primary jaw 112 to allow unintended escape of the retained cable. Such placement adjustability can be highly desirable to users for applications such as headset cable management, and this mechanism is far superior to some widely adopted alternatives such as placing a cable under a largely rigid cable retaining tab on the outer surface of a clipping jaw, or occasionally, replacing the retaining tab with some type of bulky spring device. A major disadvantage of such retaining tab structure is that, when making placement adjustments along the cable, a user will have to pull the cable without relieving the tight friction hold, which is rather difficult and can cause damages to the cable. Using the alternative spring device causes inconvenience as it requires separate motions to operate such spring devices. Further, a common disadvantage of these alternatives is their undesirable appearances due to added bulkiness on their overall form factors. In contrast, this embodiment not only easily accomplishes strain-relieved cable adjustments with the same single motion involved in operating the primary jaws but conceals the mechanism completely within the form factor of the primary jaws resulting in a smaller, sleek profile that is much more aesthetically appealing.

FIG. 7 also shows how the space between secondary jaw 118 and second primary jaw 112 can accommodate cables of various sizes. The smallest opening they form is when the tip of secondary jaw 118 rests against the bottom of a recess cut approximately half way through the thickness of the clipping portion of second primary jaw 112. From that position secondary jaw 118 can pivotally open counterclockwise as shown to increase the opening and hold cables of larger diameters. Unlike some alternative cable retaining methods cited earlier, this mechanism employs secondary torsion spring 120 to ensure proper holding tension throughout its adjustable range so that a cable can be retained in a secure and damage-free fashion.

Figure 8:
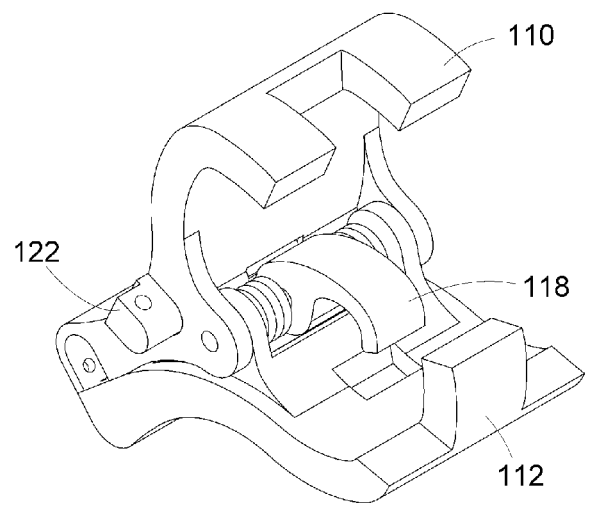
FIG. 8 is a perspective view of the first embodiment showing primary jaws in a fully open position and lever pin in working position.
Figures 9, 10:
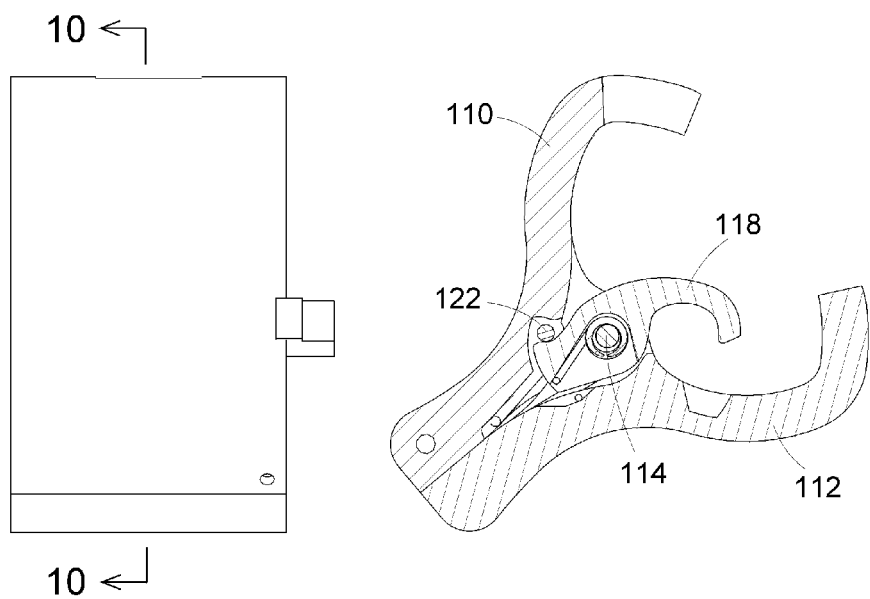
FIG. 9 is a side view of the first embodiment with primary jaws and lever pin in the same respective positions as those in FIG. 8.
FIG. 10 is a section view of the first embodiment corresponding to line 10-10 of FIG. 9.

FIGS. 8-10 illustrate yet another feature that allows easy attachment or detachment of a cable in and out of the space formed by secondary jaw 118 and second primary jaw 112. This is assisted by lever pin 122 being taken out of its storage position and placed in its working position as shown. Referring particularly to FIG. 10, as the handle of first primary jaw 110 pivotally moves toward the handle of second primary jaw 112, lever pin 122, now in working position, contacts the end portion of secondary jaw 118 and forces it to pivotally move counterclockwise along with first primary jaw 110 around the shared hinge pin 114 until both primary jaws are fully open relative to each other. This forces secondary jaw 118 to pivotally open to a greater extent than it would without the engagement of lever pin 122 as shown in FIG. 7 previously, creating enough clearance between secondary jaw 118 and second primary jaw 112 so that the cable intended to be retained therein can easily slide in or out. Similar to adjusting the cable placement recited earlier with FIG. 7, this operation is also performed using the same simple motions of opening both primary jaws once lever pin 122 is in its working position. As bonus functions, lever pin 122 can be used as a reset pin for a variety of electronic devices and as a tool to eject a SIM card for certain mobile phones.

Figure 11:
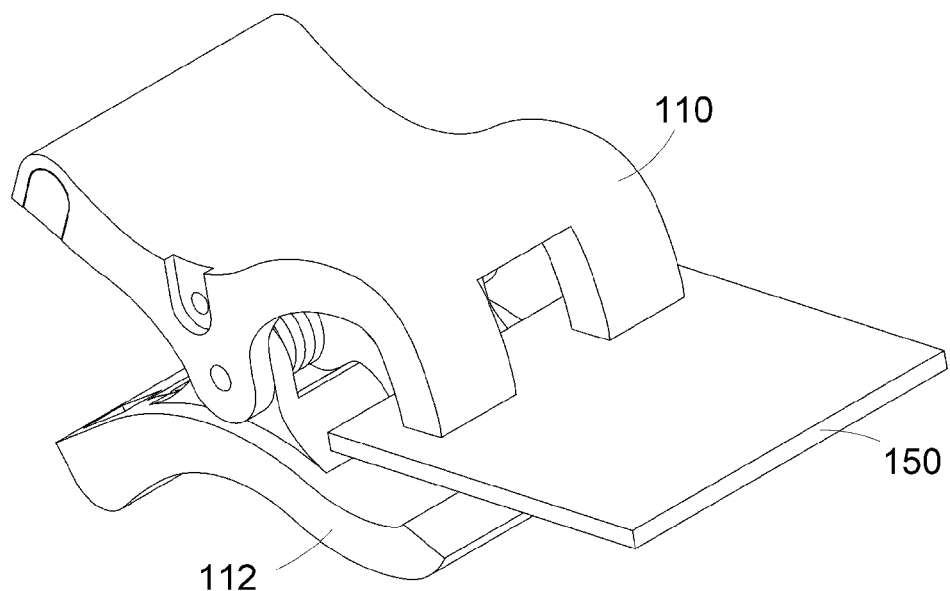
FIG. 11 is a perspective view of the first embodiment clipping onto a thin flat object.
Figure 12:
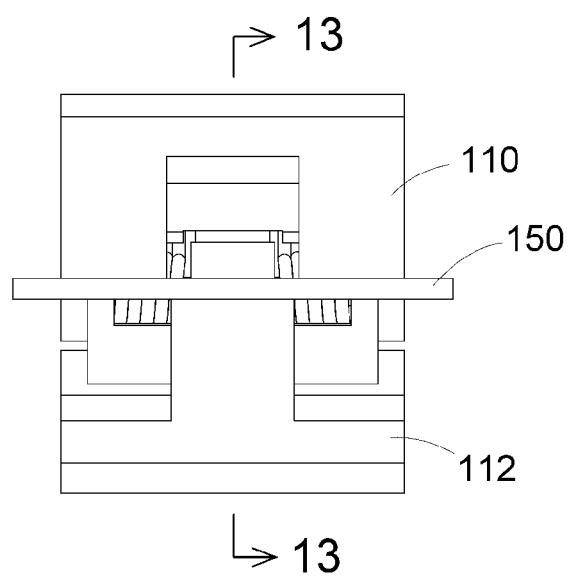
FIG. 12 is a side view of the first embodiment from FIG. 11.
Figure 13:
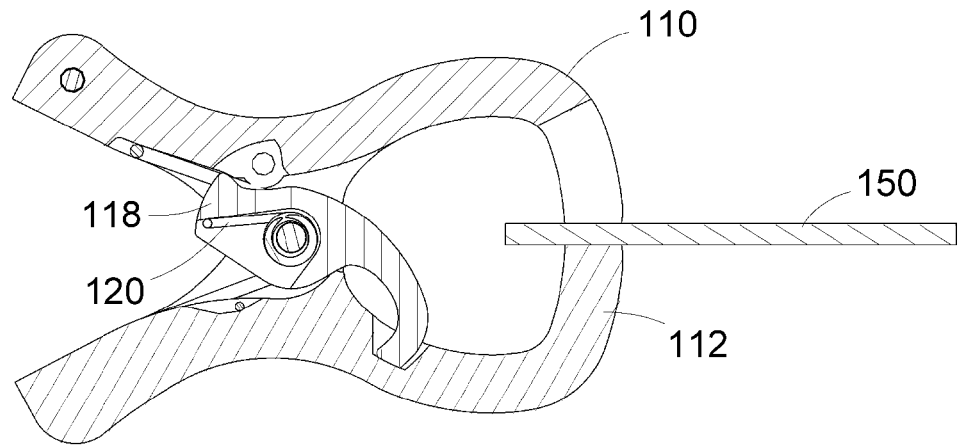
FIG. 13 is a section view of the first embodiment corresponding to line 13-13 of FIG. 12.

In certain applications such as managing the cable of a headset, a user will find it very useful to be able to affix a point of the cable to certain places such as the edge of the user's wearing apparel or a bag strap for the purposes of maintaining the microphone in an optimal position and relieving strains from the user's ears caused by the weight of the headset. The following illustrations referencing FIGS. 11-13 show how this embodiment can readily accomplish this with precision control and other beneficial features. These drawings generally represent that a user has first attached this embodiment to the cable of a headset (headset and cable not depicted) using secondary jaw 118 as previously illustrated. The user then anchors the headset by clipping the embodiment to a flat, thin object 150, which can generally represent the user's clothes or another desirable place. Because the same pinch motion is also used to loosen the grip of secondary jaw 118 on the cable, staged release controls have been designed to ensure that it will not introduce unintended effects. As best shown in FIG. 13, while the embodiment is attached to object 150, there is still ample pivotal movement clearance between the notched area on the inner surface of first primary jaw 110 and the end portion of secondary jaw 118, and secondary jaw 118 will only move when the first primary jaw 110 continues to open to a fairly excessive extent so that its notched recess area presses the end portion of secondary jaw 118 as previously recited. Such clearance allows the user to open the primary jaws big enough so as to easily clear the thickness of object 150 yet preventing the inadvertent slip of the cable held between secondary jaw 118 and second primary jaw 112. Further, there is another feature incorporated to minimize potentially undesirably impact on object 150 by the clipping force of the embodiment. Specifically, the objective is to minimize the deformation effect introduced by the interleaved tines as best illustrated in FIG. 12, in which the tines of both first primary jaw 110 and second primary jaw 112 are substantially straight and so arranged that the space between the two tines of first primary jaw 110 is only slightly larger than the width of the tine of second primary jaw 112. The purpose of having such substantially reduced gaps between adjacent tines is to substantially reduce or practically prevent the deforming and snagging effects these tines have on object 150, especially when the object is thin and made of less rigid materials such as fabric.

The primary-jaw-and-secondary-jaw combination can take various forms. For example, although only one secondary jaw was used in the illustrations of the first embodiment, a pair of secondary jaws would work in a very similar way except that, instead of having a single secondary jaw form an inner clip with one of the primary jaws, these pair of secondary jaws would form an inner clip that is operable by the outer clip formed by a pair of primary jaws. Additionally, the secondary jaws can have other forms under the same principle of having primary jaws operate secondary jaws.

Figure 14:
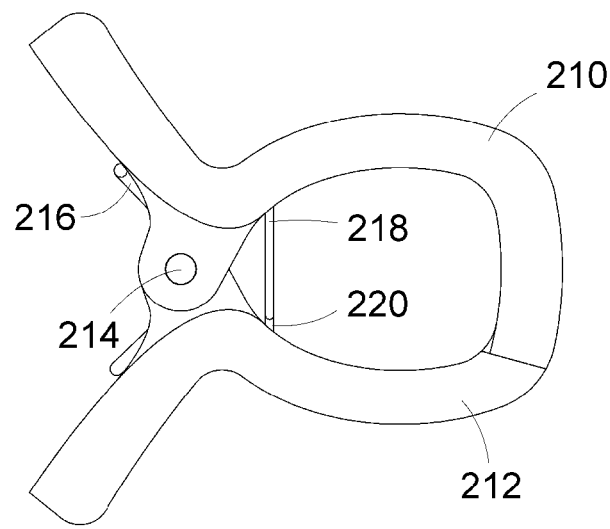
FIG. 14 is a front side view of a second embodiment in accordance with the invention shown in closed position.
Figure 15:
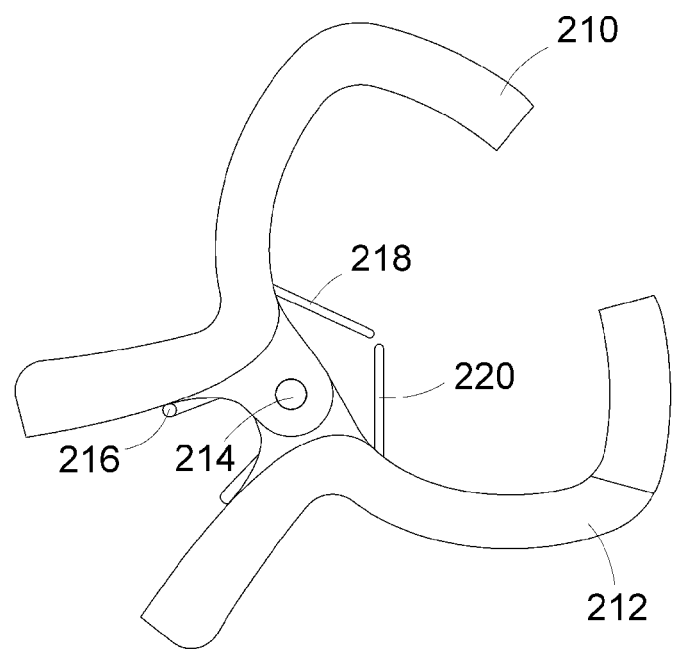
FIG. 15 is a front side view of the second embodiment shown in a partially open position.
Figure 16:
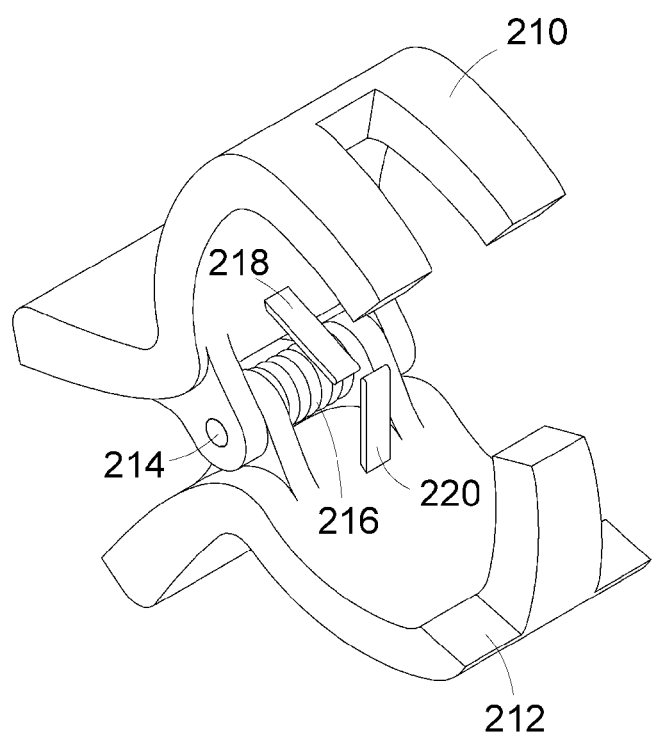
FIG. 16 is a perspective view of the second embodiment from FIG. 15.

One such example is illustrated with a second embodiment having a modified secondary jaw feature as shown in FIGS. 14-16. Instead of using a dedicated torsion spring to urge a secondary jaw, this embodiment features a pair of simplified secondary jaws: a first secondary jaw 218 and a second secondary jaw 220, which can be made of elastic materials such as spring steel, arranged in an offset manner, and directly embedded in a first primary jaw 210 and a second primary jaw 212, respectively. Similar to the first embodiment, a hinge pin 214 and a torsion spring 216 are adapted to couple primary jaws and urge them toward a closed position as shown in FIG. 14. It also shows a small, approximately triangle space between the primary jaws and secondary jaws in this closed position so that a cable can be properly retained therein, and the elastic properties of the secondary jaws can help accommodate cables of different sizes and ensure proper holding force. As the primary jaws open as shown in FIGS. 15-16, secondary jaws also open up so as to increase the aforementioned cable-retaining space and allow the slidable adjustments of the cable retained in such space, similar to the feature illustrated with the first embodiment. Also because the secondary jaws are elastic, it is easy to select their shapes, dimensions, and locations relative to primary jaws so that once the primary jaws are opened to the point where a user wants to attach or detach the cable in or out of the secondary jaws, the user can accomplish so by applying a small amount of force to the cable to overcome the elastic resistance of the secondary jaws. The cable, on the other hand, would still be effectively enclosed behind the secondary jaws if no such force was applied, benefiting the user in a similar manner to what's discussed with the first embodiment.

Figure 17:
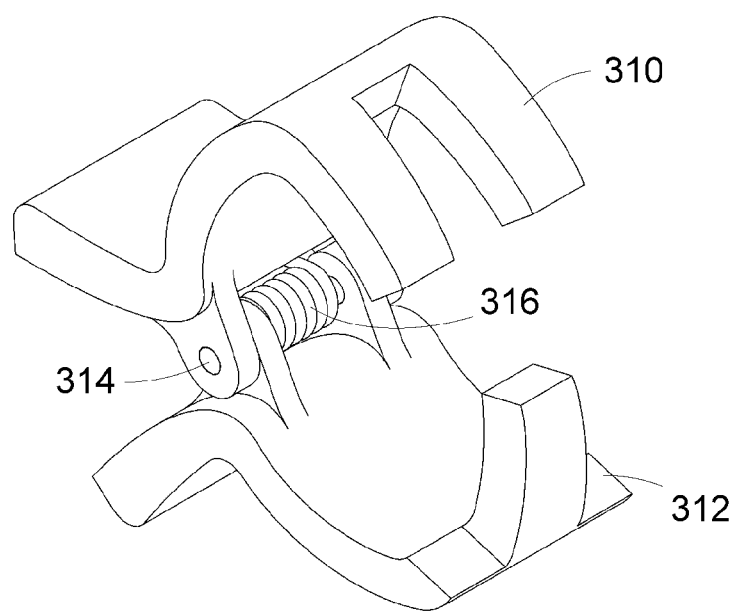
FIG. 17 is a perspective view of a third embodiment in accordance with the invention shown in a partially open position.
Figure 18:
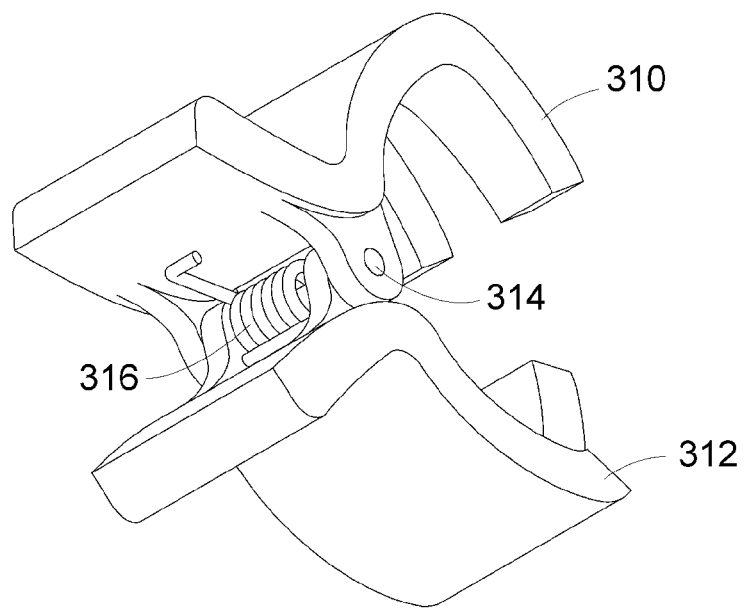
FIG. 18 is a perspective view of the third embodiment from another angle.
Figure 19:
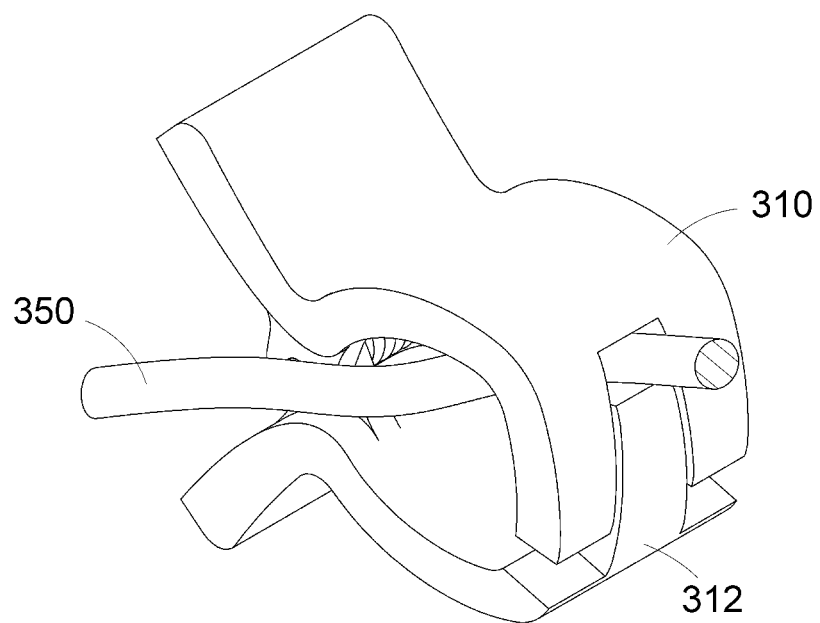
FIG. 19 is a perspective view of the third embodiment showing a cable being retained between the two tines of one jaw and secured by the tine of the other jaw.

These first two embodiments featuring secondary jaws can be attached to a cable, such as that of a headset, at all times so that a user needs not to worry that such a device may be lost or misplaced. These embodiments can of course be tailored to support different applications or preferences of users without using secondary jaws while still offering ways to keep devices at point of use. FIGS. 17-19 illustrate a third embodiment comprising a first jaw 310 hinged together with a second jaw 312 by a hinge pin 314 on which a torsion spring 316 is mounted to urge the pair of primary jaws pivotally toward a closed position. Second jaw 312 features a tine at the end of its clipping portion, and the tine is received in the space between two corresponding tines featured on first jaw 310 while in the closed position.

Similar to previous embodiments, this third embodiment is extremely easy to operate and can adapt to cables of different sizes. Additionally, FIG. 19 shows a new way to attach the embodiment to a cable 350 using the unique structure of interleaved tines. This is accomplished by placing the cable in the space between the tines of first jaw 310. As the torsion spring urges both jaws pivotally toward the closed position, the tine of second jaw 312 presses against the cable and secures it in place. This is a convenient feature to keep the embodiment precisely at the point of use and readily accessible. To help protect the retained cable from possible pinch damages in this manner, furthermore, the tip profiles of these interleaved tines are such that they have sufficient interactive portions so as to increase their contact areas on the cable, which not only help grip the cable more stably and securely but practically reduce the pinch pressure to a safe and undamaging level. Such enlarged profiles also help improve the overall stability of the embodiment that is likely made in a less-than-perfectly-rigid fashion, when such interactive portions directly engage against each other as in the closed position, so that the engaged tines will not slip relative to each other and there is no need to provide any separate stops or supports, which may interfere with cables being managed, elsewhere in the overall structure.

The first embodiment can also be used in the same way for the same purpose, yet the tines featured in this third embodiment have different geometry than that of the first embodiment to better facilitate the use of this kind. Specifically, the space between the tines of first jaw 310 is tapered so that it maximizes at the tip of the tines and gradually decreases inward; consistently, the width of the tine of second jaw 312 is such that it minimizes at the tip of the tine and gradually increases as measured away from the tip. Such variable space between adjacent tines has two advantages for this type of application: one is that it makes the operation of attaching the embodiment to a cable easier because there is an increased clearance at the point of entry between the tines of first jaw 310; the other is that it allows the embodiment to accommodate thicker cables without increasing the overall width of the embodiment or decreasing the widths of the tines toward their roots, which would adversely affect the mechanical strength of those tines. In the case that a cable is too thick to be held against the bottom of the space between the two tines of first jaw 310, it will still suffice for the purpose as long as the cable can at least partially enter the space and secured by the tine of second jaw 312.

Figure 20:
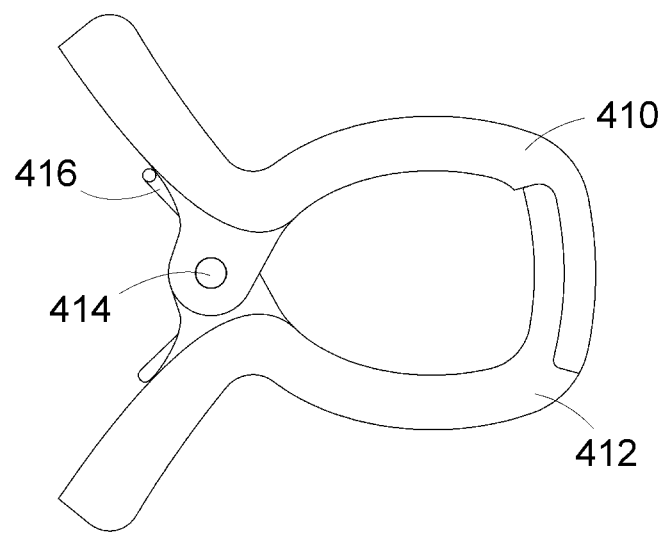
FIG. 20 is a front side view of a fourth embodiment in accordance with the invention featuring offset tips.
Figure 21:
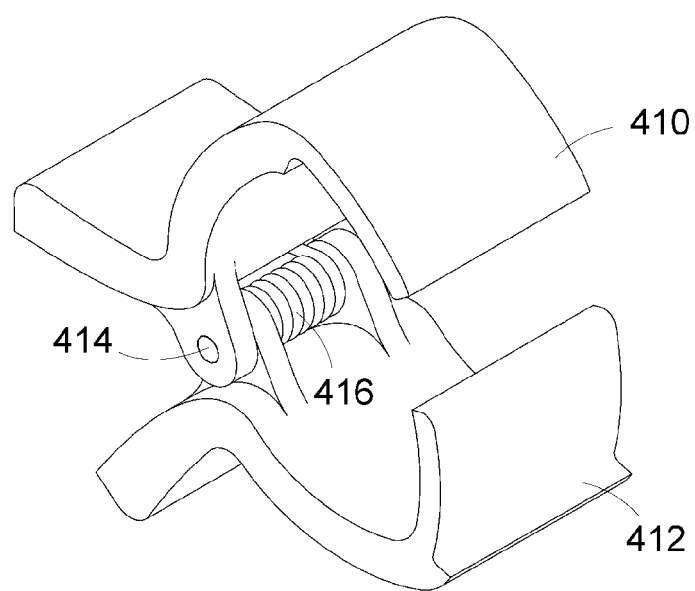
FIG. 21 is a perspective view of the fourth embodiment shown in a partially open position.

All embodiments so far have been illustrated with interleaved tines to exemplify how they function to accommodate cables of various sizes and support additional benefits. There are of course alternative overlapping forms that can be adapted to achieve similar results. For example, as shown in FIGS. 20-21 as a fourth embodiment, a clip-type device comprises a first jaw 410, a second jaw 412, a hinge pin 414 connecting the two jaws, and a torsion spring 416 urging the two jaws toward a closed position. The tip portions of the jaws are disposed in an offset fashion so as to have a range of holding capacity similar to that of embodiments having interleaved tines.

Figure 22:
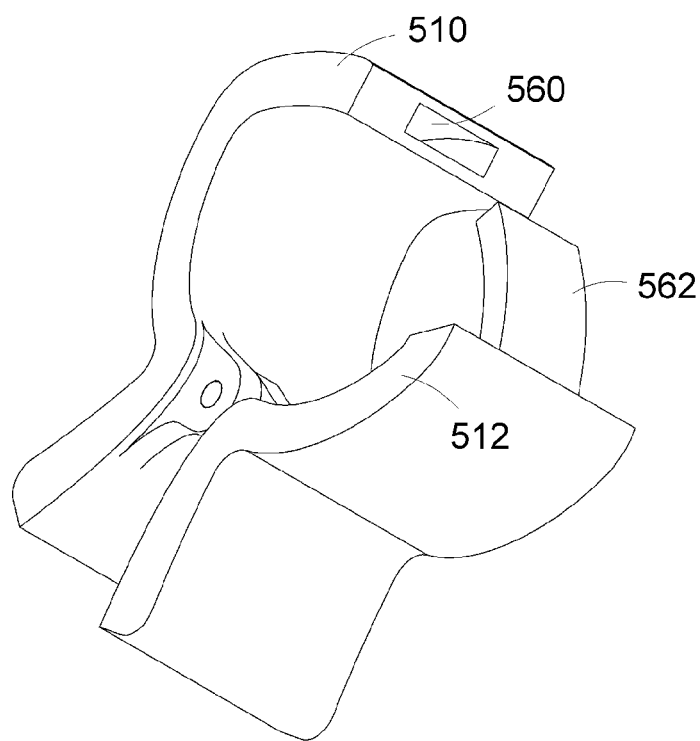
FIG. 22 is a perspective view of a fifth embodiment in accordance with the invention featuring a recess-and-protrusion combination on the tips of jaws.

A fifth embodiment is shown in FIG. 22 as another variation. Sharing the same hinge pin and torsion spring as the fourth embodiment, this example features a first jaw 510 having a recess 560 at its tip portion and a second jaw 520 having a matching protrusion 562 at its tip portion. This recess-and-protrusion combination functions in a similar way to both interleaved tines and offset tips with regard to holding cables of various volumes.

Considering the structures, operations, and functions described thus far, it is evident that these cable management devices in accordance with the invention not only have rich features but are extremely easy and quick to operate. Putting it into perspective, any user who enjoys the ease of use of a conventional clip can apply the same single pinch motion and readily accomplish all of the following functions:

(a) keeping cables managed with proper tension;

(b) quickly gripping cables into a managed state and deploying cables from the managed state;

(c) applying a single device to a range of cable sizes or to a cable folded into a bundle in different manners;

(d) attaching the device to the cable, permanently or ad hoc, to prevent misplacement and ensure that the device is always at point of use;

(e) quickly adjusting the position of the device relative to the cable; and (f) attaching the device along with retained cable to an object such as user's clothes for additional benefits.

As far as user-friendliness is concerned, what's more, a user will find it just as quick and easy to perform certain combinations of those functional steps. Using the first embodiment, for example, the user may first attach the device to the cable of a headset then affix the device along with the cable to his or her clothes via the primary jaws. When this user wants to make necessary adjustments to better position the microphone, all he or she has to do is using two fingers to pinch open the primary jaws to approximately their full extent, which allows the detachment of the device from the clothes and meanwhile loosens the grip of the secondary jaw on the cable. While keeping the same pinch hold, the user simply slides the device along the cable to a desired spot and releases the pinch hold to reattach it back on the clothes. If this user demands high precision, he or she may release the pinch hold about half-way after repositioning the device relative to the headset cable, which re-engages the grip of the secondary jaw on the cable. Then the user selects the precise affixing spot on the clothes and fully releases the device there. Because there are no other discrete motions required, all such adjustments are accomplished quickly and naturally. This kind of exceptional ease of use is particularly valuable when the operations are performed frequently or in situations such as operating a motor vehicle where for safety reasons, the user can only afford one hand to do all intended cable deployments and adjustments.

As recited previously, furthermore, a user can take the advantage of the integrated lever pin and use it as a handy tool to reset electronic devices or eject SIM cards from certain mobile phones.

Finally, all of the above functionalities and user-friendly features are packed into a compact and smooth form factor bearing the aesthetics superior to many far less functional alternative devices.

While the above description contains many specificities, these should not be construed as limitations on the scope, but rather as an exemplification of the embodiments thereof. Many other variations are possible within the teachings of the disclosure.

For example, the jaws of the devices can include different numbers of tines, and those tines can take various particular shapes. When overlapping tips are featured for either primary jaws or secondary jaws, they can be interleaved tines, offset tips, a recess-and-protrusion combination, or their equivalents. Additionally, there is no requirement as to how much the tips of primary jaws have to overlap, as long as they are substantially overlapped so as to vary the holding space in between them and securely retain a relatively large range of cable volumes. This is to distinguish from certain existing clips, such as selected ones used on headsets, which technically may have slightly overlapped tip portions. However, this kind of feature is clearly intended for different purposes such as increasing the friction hold when clipped onto a user's clothes and is not suitable for managing cables of various volumes. For devices featuring simplified secondary jaws as illustrated in the second embodiment, such secondary jaws can be affixed to primary jaws through assembly or integrated with primary jaws through processes such as injection molding. Also such secondary jaws can be entirely elastic, such as tabs made of spring steel, or just have at least a portion that is elastic, such as adding a rubber tip to a hard molded plastic member that extends from the surface of a primary jaw. It is also possible to use such secondary jaws that are not elastic at all, as long as these secondary jaws are operable through primary jaws to vary their cable-retaining space so that the cable can be properly retained, position-adjusted, and detached as desired by operating the primary jaws. Further, there can be a plurality of above mentioned secondary jaws or just one as long as it can form a functional enclosure to retain at least one cable or one cable section separately from other cables or cable sections. Lastly, for the first two embodiments and their equivalents featuring at least a secondary jaw operable through the primary jaws, overlapping tips are not indispensable to the primary jaw structure in order for a user to enjoy many benefits such devices have to offer, although their adaptability to different cable volumes may become substantially limited.

For a second example, a hinge pin is used in combination with the jaws to constitute a hinge means for connecting the jaws and regulating their pivotal movement relative to each other around the axis of the hinge. In additional to a hinge pin, such hinge means can include all the equivalent variations such as a rivet, a screw, and nut-and-bolt combination, and a recess-and-protrusion combination defining the connection and pivotal mobility between the jaws. In the case that a torsion spring is used without a conventional hinge pin around which the torsion spring is typically wound, the torsion spring can stay unhinged and still suffice for the purpose of urging a pair of jaws toward closure as seen in many applications. Similarly, the secondary torsion spring used in the first embodiment can be replaced by a flat spring bent into a V-shape disposed between the end potion of the secondary jaw and the second primary jaw without touching the hinge pin, and this alternative can be beneficial due to simplified assembly. Further, it would not deviate from the principle of the invention if a device employed a plurality of hinge means at the same time such as one for the pair of primary jaws yet a separate one dedicated to the secondary jaw and one of the primary jaws, as opposed to the shared hinge pin structure in the first embodiment.

For a third example, the lever pin disposable in the storage position and in the working position in the first embodiment is provided as an engagement mechanism to open the secondary jaw to a greater extent than it would without such mechanism. The essence of this mechanism is such that an object is disposable in different positions so as to differentiate the magnitude of second jaw's pivotal movement. Thus, it will be very easy for a person skilled in the art to use alternative apparatus to accomplish the same. One such apparatus can be a sliding member mounted on a primary jaw so that the sliding member can be slidably disposed to engage the secondary jaw in order to increase its pivotal movement. Another such apparatus can be a hinged member mounted on a primary jaw so that the hinged member can be pivotally disposed to engage the secondary jaw for the same purpose. Yet another equivalent apparatus can be a spacer disposed between the two handles of the primary jaws so as to limit the opening of the secondary jaw by limiting the opening of the primary jaws, then the spacer can be disposed away to allow the full opening of the primary jaws, leading to the increased opening of the secondary jaw. The engagement mechanism that disposes the lever pin or its equivalents, collectively referred to as levers, into and away from a working position can be a linear movement, a rotary movement, or a combination of both. Further, such levers are not strictly indispensable for increasing the opening of the secondary jaw. A user may simply use a finger or an external tool to assist in urging the secondary jaw open by a greater amount.

For a fourth example, a torsion spring in all embodiments can be replaced by another elastic member such as an annular spring, a clip spring, a flat spring, a compression spring, an extension spring, a rubber band, or an elastic part integrated in the pair of jaws which can be made of more or less elastic materials such as elastic plastic. This elastic member can be incorporated in many suitable ways to interact with the jaws as long as it results in the jaws being urged toward a closed position.

Additionally, size, material, or manufacturing process is not essential to this invention. Although under current state of the art, certain components are more commonly made in certain ways, such as in the first embodiment using a metal hinge pin, injection-molded thermoplastic jaws, and torsion springs made of spring steel, all components of those devices can be made of many commercially available materials by various manufacturing processes into different sizes. Also the definition of cable used throughout this disclosure should be broadly construed as general representation of elongated objects such as cables, cords, wires, strings, straps, laces, rods, and tubes. Further, when a cable is referred to, it can mean a single standalone cable or its equivalents such as a parallel double-corded cable as seen in many earphones and headsets. Similarly, when cables are referred to, they can be a plurality of individual cables, a single cable folded or coiled into a bundle, or a combination of the two.

Accordingly, the invention should not be narrowly construed as the embodiments or examples described and illustrated heretofore. Reference should be made to the appended claims and their legal equivalents in determining the full scope of the invention.

What is claimed is:

1. An apparatus for managing cables, comprising:
   a first primary jaw;
   a second primary jaw;
   a hinge means connecting said first primary jaw and said second primary jaw;
   a primary elastic member interacting with and urging said first primary jaw and said second primary jaw pivotally toward a closed position around the axis of said hinge means;
   a first secondary jaw pivotally disposed on the axis of said hinge means between said first primary jaw and said second primary jaw, said first secondary jaw coupled with and operable by said first primary jaw and said second primary jaw; and
   a secondary elastic member urging said first secondary jaw toward a closed position so as to securely retain at least one cable between said first primary jaw and said second primary jaw.

2. The apparatus of claim 1, wherein said first primary jaw and said second primary jaw in said closed position have overlapping tips selected from the group consisting of interleaved tines, offset tips, and a recess-and-protrusion combination so as to accommodate a predetermined range of cable volume between said first primary jaw and said second primary jaw.

3. The apparatus of claim 2, wherein said overlapping tips are substantially straight interleaved tines engageable with substantially reduced gaps therebetween, said overlapping tips having substantially flat ends, whereby said first primary jaw and said second primary jaw can clip onto less rigid objects with substantially reduced deforming and snagging effects.

4. The apparatus of claim 1, wherein said first secondary jaw is disposed in relation to said first primary jaw and said second primary jaw in such a manner that said first secondary jaw is not engaged by said first primary jaw and said second primary jaw to move until said first primary jaw and said second primary jaw pivotally move away from each other from said closed position by a predetermined amount.

5. The apparatus of claim 4, further comprising a lever disposable in a working position on the combination of said first primary jaw and said second primary jaw so as to engage with and increase the opening of said first secondary jaw.

6. The apparatus of claim 5, wherein said lever is disposable in said working position by an engagement mechanism selected from the group consisting of linear movement, rotary movement, and a combination thereof.

7. The apparatus of claim 1, wherein said primary elastic member is selected from the group consisting of a torsion spring, an annular spring, a clip spring, a flat spring, a compression spring, an extension spring, a rubber band, and an elastic part integrated in the combination of said first primary jaw and said second primary jaw.

8. The apparatus of claim 1, wherein said secondary elastic member is selected from the group consisting of a torsion spring, an annular spring, a clip spring, a flat spring, a compression spring, an extension spring, a rubber band, and an elastic part integrated in the combination of said first primary jaw, said second primary jaw, and said first secondary jaw.

9. The apparatus of claim 5, wherein said first primary jaw and said second primary jaw have interleaved tines, said hinge means is a hinge pin, said primary elastic member is a primary torsion spring wound around said hinge pin, said first secondary jaw is pivotally disposed onto said hinge pin so as to form an enclosed space with said second primary jaw, said secondary elastic member is a secondary torsion spring urging said first secondary jaw toward said second primary jaw, the inner surface of said second primary jaw has a recess of a predetermined depth receiving the tip portion of said first secondary jaw, and said lever is a lever pin slidably disposable in said working position.

10. The apparatus of claim 1, further comprising a second secondary jaw urged by said secondary elastic member toward said first secondary jaw so as to form an inner clip between said first primary jaw and said second primary jaw.

11. An apparatus for managing cables, comprising:
    a first primary jaw;
    a second primary jaw;
    a hinge means connecting said first primary jaw and said second primary jaw;
    a primary elastic member interacting with and urging said first primary jaw and said second primary jaw pivotally toward a closed position around the axis of said hinge means; and
    a secondary jaw coupled with and operable by said first primary jaw and said second primary jaw so as to be able to retain at least one cable, said secondary jaw disposed in relation to said first primary jaw and said second primary jaw such that said secondary jaw is not engaged by said first primary jaw and said second primary jaw to move until said first primary jaw and said second primary jaw pivotally move away from each other from said closed position by a predetermined amount.

12. The apparatus of claim 11, further comprising a lever disposable in a working position on the combination of said first primary jaw and said second primary jaw so as to engage with and increase the opening of said secondary jaw.

13. The apparatus of claim 11, wherein said primary elastic member is a double torsion spring having two coil sections and a space therebetween, said secondary jaw disposed in said space.

14. The Apparatus of claim 11, wherein said first primary jaw and said second primary jaw in said closed position have overlapping tips selected from the group consisting of interleaved tines, offset tips, and a recess-and-protrusion combination so as to accommodate a predetermined range of cable volume between said first primary jaw and said second primary jaw.

15. The Apparatus of claim 14, wherein said overlapping tips are substantially straight interleaved tines engageable with substantially reduced gaps therebetween, said overlapping tips having substantially flat ends, whereby said first primary jaw and said second primary jaw can clip onto less rigid objects with substantially reduced deforming and snagging effects.

16. The Apparatus of claim 11, further comprising a secondary elastic member urging said secondary jaw toward either said first primary jaw or said second primary jaw.

17. The Apparatus of claim 11, wherein said secondary jaw is pivotally disposed around said hinge means to retain said at least one cable against said second primary jaw such that the gap between the tip of said secondary jaw and the inner surface of said second primary jaw is smaller than the diameter of said at least one cable when said first primary jaw and said second primary jaw are in a fully open position, whereby unintended detachment of said at least one cable is prevented.

18. An apparatus for managing cables, comprising:
  a first primary jaw;
  a second primary jaw;
  a hinge means connecting said first primary jaw and said second primary jaw;
  a primary elastic member interacting with and urging said first primary jaw and said second primary jaw pivotally toward a closed position around the axis of said hinge means;
  a secondary jaw disposed between said first primary jaw and said second primary jaw, said secondary jaw coupled with and operable by said first primary jaw and said second primary jaw; and
  a secondary elastic member urging said secondary jaw toward a closed position so as to securely retain at least one cable against said second primary jaw.

* * * * *